(12) United States Patent
Matsui et al.

(10) Patent No.: US 8,236,408 B2
(45) Date of Patent: Aug. 7, 2012

(54) METHOD OF MANUFACTURING OPTICAL LAMINATE

(75) Inventors: Kiyotaka Matsui, Okayama (JP); Masataka Nakashima, Okayama (JP); Kiyoshi Itoh, Kanagawa (JP)

(73) Assignee: Dai Nippon Printing Co., Ltd., Toyko (JP)

( * ) Notice: Subject to any disclaimer, the term of this patent is extended or adjusted under 35 U.S.C. 154(b) by 1185 days.

(21) Appl. No.: 12/005,388

(22) Filed: Dec. 27, 2007

(65) Prior Publication Data

US 2011/0123774 A1    May 26, 2011

(30) Foreign Application Priority Data

Dec. 27, 2006 (JP) ................. 2006-352912
Dec. 13, 2007 (JP) ................. 2007-321538

(51) Int. Cl.
*B32B 3/00* (2006.01)
*B32B 5/16* (2006.01)
*B32B 7/14* (2006.01)

(52) U.S. Cl. ........ 428/172; 428/143; 428/173; 428/204; 428/206; 428/156; 428/161

(58) Field of Classification Search .......... 428/156, 428/161, 166, 172, 173, 203, 204, 206, 143, 428/148, 167, 68, 141, 168, 207, 323, 328, 428/329, 330, 337, 339; 427/162, 164, 163.4, 427/307, 308, 309
See application file for complete search history.

(56) References Cited

U.S. PATENT DOCUMENTS

| | | | | |
|---|---|---|---|---|
| 5,204,160 | A | * | 4/1993 | Rouser .................... 428/167 |
| 2003/0214720 | A1 | * | 11/2003 | Bourdelais et al. ........... 359/599 |
| 2006/0132922 | A1 | * | 6/2006 | Takao et al. .................. 359/601 |
| 2006/0134430 | A1 | | 6/2006 | Nakashima et al. |

FOREIGN PATENT DOCUMENTS

| | | |
|---|---|---|
| JP | 2000-094590 A | 4/2000 |
| JP | 2003-075603 A | 3/2003 |
| JP | 2003-121618 A | 4/2003 |
| JP | 2003-131007 A | 5/2003 |
| JP | 2003-205563 A | 7/2003 |
| JP | 2006126808 A | 5/2006 |
| WO | 2006132180 A1 | 12/2006 |

OTHER PUBLICATIONS

Japanese Office Action dated Apr. 10, 2012, issued in corresponding Japanese Patent Application No. 2007-321538.

* cited by examiner

*Primary Examiner* — Catherine A Simone
(74) *Attorney, Agent, or Firm* — Sughrue Mion, PLLC

(57) ABSTRACT

To provide an optical laminate that can sufficiently exhibit the function of a functional material such as an antistatic agent or fine particles in the obtained laminate without using a binder material for fixing the functional material to the substrate, as well as a method for manufacturing the same, there is obtained the optical laminate by step (A1) in which the substrate is coated with a composition (a) containing a solvent capable of swelling or dissolving the substrate and the functional material, step (A2) of drying, and step (A3) of forming a resin layer on the coated substrate.

9 Claims, 5 Drawing Sheets
(2 of 5 Drawing Sheet(s) Filed in Color)

METHOD OF MANUFACTURING OPTICAL LAMINATE

BACKGROUND OF THE INVENTION

1. Field of the Invention

This invention relates to an optical laminate and to a method of manufacturing the same.

2. Related Background Art

In image display devices such as cathode ray tube displays (CRT), liquid crystal displays (LCD), plasma displays (PDP) and electroluminescence displays (ELD), the outermost surfaces are provided with optical laminates exhibiting various functions such as anti-reflection, hardness and transparency.

In the past, a wide variety of structures have been proposed for optical laminates, and examples include those with a substrate, antistatic layer, hard coat layer and low refractive index layer laminated in that order, and those with a substrate, hard coat layer, high refractive index layer and low refractive index layer laminated in that order.

Usually when a functional layer such as an antistatic layer or high refractive index layer is formed on a substrate or a hard coat layer, its coating or fixing of the film in the production line is hampered unless the functional material comprising the antistatic agent or fine particles is dispersed in a binder material. A "binder" in this case represents a resin component such as a monomer, oligomer or prepolymer that undergoes crosslinking by heat or ionizing radiation (UV, EB or the like).

When a functional layer is formed to modulate the conductivity or refractive index, it has been, therefore, common to use a coating composition containing a function-exhibiting material dispersed in a binder material, with the concentration adjusted using a solvent or the like (for example, see Patent Documents 1 and 2).

However, compositions dispersed using a binder material have been associated with various problems including a short pot life, the need for multiple dispersing steps, reduced dispersion stability, gelling, and deterioration of the optical characteristics of the coated film with time. Care must, therefore, be taken in selecting the binder material, and a considerable amount of time has been spent investigating new materials.

Patent Document 3 discloses a solvent that swells or penetrates the substrate as an essential factor which allows triacetylcellulose (TAC) or the like to prevent interference patterns. Furthermore, since the refractive index near the interface between the substrate and the hard coat layer must vary in a continuous manner, it is presumed that the hard coat material penetrates into the substrate by the solvent.

However, such penetration makes it impossible to maximize the function of the functional material. Moreover, because a hard coat (binder) is indispensable, even though a functional material is present in the binder it is not possible to realize contact of the functional materials without a binder as according to this invention; therefore, high function cannot be exhibited.

Patent Document 4 also discloses a solvent that swells or permeate the substrate as an essential factor which allows TAC or the like to prevent interference patterns. There is also disclosed that coating of the hard coat material with such a solvent forms a resin layer as the solvent dissolves the substrate, thus allowing discontinuous microirregularities to be formed at the interface, but this method also requires a binder as in Patent Document 3, and therefore, does not allow the high function of the functional material to be exhibited.

The invention described in Patent Document 5 employs a step using a solvent that dissolves the substrate, but the resin coated together with the solvent is required to penetrate the substrate. Therefore, since this proposed method also differs from this invention while requiring a translucent resin, it cannot yield products that maximize the function of the functional material.

[Patent Document 1] Japanese Patent Laid-open (Kokai) Publication No. 2000-94590

[Patent Document 2] Japanese Patent Laid-open (Kokai) Publication No. 2003-75603

[Patent Document 3] Japanese Patent Laid-open (Kokai) Publication No. 2003-131007

[Patent Document 4] Japanese Patent Laid-open (Kokai) Publication No. 2003-205563

[Patent Document 5] Japanese Patent Laid-open (Kokai) Publication No. 2003-121618

SUMMARY OF THE INVENTION

Disclosure of the Invention

Problems to be Solved by the Invention

In light of the above, this invention provides an optical laminate that can be obtained without using a binder material for bonding and fixing of functional materials such as antistatic agents and fine particles onto the substrate, thereby allowing the function of the functional material to be adequately exhibited, as well as a method of manufacturing the same.

Specifically, the manufacturing method of the invention can yield an optical laminate capable of maximally exhibiting the function of the functional material (for example, an antistatic function or refractive index controlling function) in order to exhibit higher function.

Means for Solving the Problems

The optical laminate of the invention is an optical laminate comprising a functional material placed on concave surfaces of irregularities formed on the surface of a substrate so that the materials can be in binderless contact with each other, or a functional material placed so that most of the materials can be in contact with each other through only a minimum amount of dispersing agent, and further comprising a laminated resin layer formed thereon.

The substrate of the optical laminate of the invention may be composed of a single layer or two or more layers, and the substrate may be a transparent substrate material. The substrate of the optical laminate of the invention may be cellulose triacetate.

The functional material in the optical laminate of the invention may be an antistatic agent or high refractive index agent, or the functional material may be an organic material having a weight-average molecular weight of 5,000-300,000. Alternatively, the functional material in the optical laminate of the invention may be an inorganic material, and the resin layer may be a hard coat layer or low refractive index layer.

The invention further provides a method of manufacturing an optical laminate comprising:

a step (A1) of coating a substrate with a composition (a) containing a solvent capable of swelling or dissolving the substrate, and a functional material;

a step (A2) of drying; and a step (A3) of forming a resin layer on the coated substrate, as well as provides an optical laminate obtained by the method.

According to the invention, coating of the composition (a) is preferably followed by formation of irregularities on the surface of the substrate.

The invention further provides a method of manufacturing an optical laminate comprising:

a step (B1) of coating a substrate with a solvent capable of swelling or dissolving the substrate;

a step (B2) of coating with a composition (b) containing a functional material and a diluting solvent;

a step (B3) of drying; and a step (B4) of forming a resin layer on the coated substrate, as well as provides an optical laminate obtained by the method.

According to the invention, coating of the solvent capable of swelling or dissolving the substrate is preferably followed by formation of irregularities on the surface of the substrate.

The optical laminate of the invention is also an optical laminate comprising a functional material placed on concave surfaces of irregularities formed on the surface of a substrate so that the materials can be in binderless contact with each other, and further comprising a resin layer formed thereon.

According to the invention, the substrate may be composed of a single layer or two or more layers. Alternatively, it may be a transparent substrate material. Preferably, the substrate is cellulose triacetate and the solvent capable of swelling or dissolving the substrate is an ester and/or ketone with a weight-average molecular weight of less than 100.

More preferably according to the invention, the substrate is cellulose triacetate and the solvent capable of swelling or dissolving the substrate is at least one member selected from the group consisting of methyl ethyl ketone, ethyl acetate, methyl acetate, cyclohexanone and cyclopentanone.

Even more preferably according to the invention, the substrate is cellulose triacetate and the solvent capable of swelling or dissolving the substrate is cyclohexanone.

Also preferably according to the invention, the substrate is a transparent substrate material, the functional material is an antistatic agent and the resin layer is a hard coat layer.

Also preferably according to the invention, the substrate is a transparent substrate material, the functional material is a high refractive index agent and the resin layer is a low refractive index layer.

This invention will now be explained in greater detail.

Step (A1) in the manufacturing method of the invention having been carried out allows the substrate to be swelled or dissolved by the solvent used, so that the functional material can be placed on the surface of the coated substrate. After then drying off the solvent in step (A2), a resin layer is formed on the substrate coated with composition (a) in step (A3). This covers the functional material on the substrate with the resin layer, thus fixing it onto the substrate. As a result, an optical laminate is obtained having a construction with the functional material sandwiched and fixed between the substrate and the resin layer, so that the optical laminate can adequately exhibit the function of the functional material.

Step (B1) in the manufacturing method of the invention having been carried out allows the substrate to be swelled or dissolved by the solvent used. The composition (b) is then coated in step (B2), so that the functional material can be placed on the solvent-coated substrate.

Steps (B3) and (B4) having been carried out allow the functional material in the substrate to be coated with a resin layer and to fix it onto the substrate, as in steps (A2) and (A3). As a result, the obtained optical laminate can thus adequately exhibit the function of the functional material.

Placement of the functional material according to the invention means that the functional material is directly in contact with the surface of the substrate without being embedded or penetrating into the substrate even when the substrate is dissolved or swelled by the solvent. However, a portion or some portions thereof may become incorporated in the substrate depending on the size of the functional material and the structure of the substrate.

Since the compositions (a) and (b) used in the manufacturing method of the invention do not contain binder components as essential components, it is possible to preclude the drawbacks resulting from the use of binder components. The cost of binder materials can also be avoided. A "binder" according to the invention is a resin monomer, oligomer or prepolymer that undergoes crosslinking and hardened by heat or ionizing radiation.

According to the invention, the inorganic or organic functional material is coated onto the substrate without a binder.

When an organic material is used as the functional material, its weight-average molecular weight is preferably in the range of 5,000-300,000 in order to satisfactorily retain the functional material on the substrate.

Because a substrate-swelling solvent is used in the composition laminated on the functional layer, a weight-average molecular weight of less than 5,000 likely leads to infiltration of the material into the substrate by the solvent, making it impossible to achieve the desired function. At above 300,000, on the other hand, the function will increase but preparation of an ink will become difficult. The preferred range for the weight-average molecular weight is 50,000-150,000, from the viewpoint of balance between the function to be exhibited and the dispersibility of the functional material in the solvent.

When an inorganic material is used as the functional material, a dispersing agent may preferably be added at 0-30 wt %, more preferably 1-30 wt % and even more preferably 10-25 wt % relative to the inorganic material, for dispersion of the inorganic material in the solvent. Dispersion in the solvent is also possible without a dispersing agent depending on the dispersion method and materials, but addition of a dispersing agent at 30 wt % or less is preferred to obtain a coating solution that is stable for prolonged periods. Specifically, when the functional material is an inorganic material, the invention resides in a method of manufacturing an optical laminate wherein composition (a) or composition (b) contains a dispersing agent for dispersion of the inorganic material in the solvent.

The functional material of the invention may be formed on the substrate in such a state that the materials are in direct contact with each other. That is, according to the prior art, a large amount of binder infiltrates between the materials and reduces the area of direct contacting sections. However, according to the invention there is no infiltration of the binder between the materials; therefore, the function of the functional material can be maximally exhibited.

Moreover, a resin layer provided as an overcoat layer on the functional material layer reaches the functional material in direct contact with the substrate, and fills only the gap sections where the functional material is not in contact therewith. While filling the gap sections, the resin layer also reaches and contacts the substrate surface. As a result, it helps to firmly fix the substrate and functional material. The resin layer serving as the overcoat layer does not need to penetrate into the substrate.

This method allows the amount of binder used to be absolutely minimized. The substrate preferably swells with the solvent to produce irregularities as shown in FIGS. 1 and 2.

For example, when the functional material is an inorganic metal oxide, it will bond to the substrate by forming chemical bonds through the hydroxyl or other groups of the material. However, such bonding is very weak and unsuitable for practical production.

With the irregularities, this invention contrastingly accomplishes physical as well as chemical bonding, to obtain a product with higher function.

Moreover, since the functional materials placed in the recesses are adjacent to and in direct contact with each other without a binder, they satisfactorily exhibit the function. While this function may be partially interrupted at the raised areas, the functional materials satisfactorily occupy a majority of the recesses and the small raised areas, so that the functional material layer overall exhibits the desired function continuously as if the materials communicated with each other.

[First Optical Laminate Manufacturing Method]

Step (A1) is carried out, by which a substrate is coated with a composition (a) containing a solvent capable of swelling or dissolving the substrate and a functional material. This allows the substrate to be swelled or dissolved by the solvent, so that the functional material can be placed on the surface of the coated substrate.

In step (A1), the substrate may be an optically transparent substrate material or hard coat layer that can be coated with the composition (a) and can have the functional material placed thereon. The substrate may appropriately be constructed with a single layer or two more layers.

The functional material is not particularly limited so long as it is a material that can impart a property such as an antistatic property to the optical laminate, and as examples there may be mentioned an antistatic agent and high refractive index agent.

In step (A1), the solvent capable of swelling or dissolving the substrate is a solvent that is capable of permeating, swelling, wetting or dissolving the substrate and is not particularly limited so long as it has such a property.

As solvents capable of swelling or dissolving the substrate, there may be mentioned: ketones such as acetone, methyl ethyl ketone, cyclohexanone and diacetone alcohol; esters such as methyl formate, methyl acetate, ethyl acetate and ethyl lactate; nitrogen-containing compounds such as nitromethane, acetonitrile, N-methylpyrrolidone and dimethylformamide; glycols such as methyl glycol and methyl glycol acetate; ethers such as tetrahydrofuran, dioxane and dioxolane; halogenated hydrocarbons such as methylene chloride, chloroform and tetrachloroethane; and in addition dimethyl sulfoxide, propylene carbonate and the like. Cyclohexanone and methyl ethyl ketone are preferred among these as solvents with a satisfactory balance between attack strength for the substrate and drying speed, as well as productivity. One of the aforementioned solvents or a mixture of two or more thereof may be used, and alcohols such as methanol, ethanol, isopropanol, butanol or octanol or aromatic hydrocarbons such as benzene, toluene, xylene or ethylbenzene, as solvents that do not swell or dissolve the substrate, may be mixed for use at up to about 40% of the total solvent volume.

The composition (a) can be obtained by mixing and dispersing the components including the functional material and the solvent capable of swelling or dissolving the substrate. The mixing and dispersion may be accomplished by a known method in the prior art, and for example, a paint shaker or bead mill may be employed.

The method of coating the composition (a) may be any coating method such as roll coating, Meyer bar coating or gravure coating.

After coating the composition (a) in step (A1), irregularities are preferably formed on the surface of the substrate. These irregularities are formed because the substrate is swelled or dissolved by the solvent. Formation of irregularities can prevent adhesion of the functional material onto a roll during formation of the resin layer by line processing using a roll or the like in step (A3). While the reason why it prevents adhesion is not fully understood, it is believed to be that the functional material is placed not at the raised areas but in the recesses, and only the raised areas come into contact with the roll.

Step (A1) is then followed by the drying step (A2). This step allows drying and evaporation of the solvent used in step (A1).

The drying in step (A2) may be carried out by a known method, and for example, it may be a method of heating at 50-80° C. for 30-600 seconds.

Step (A2) is followed by step (A3) in which a resin layer is formed on the substrate that has been coated with the composition (a) (the side of the substrate on which the composition (a) has been coated). This can cover the functional material on the substrate with the resin layer, thus fixing it to the substrate. The resin layer contacts the functional material placed on the substrate and contacts the substrate at least through the gaps in the functional material, thus functioning as an overcoat layer to cover the functional material. In other words, the resin layer also serves as an overcoat layer.

The resin layer means a layer (other than the substrate) containing a resin component in the optical laminate, and for example, there may be mentioned a hard coat layer, high refractive index layer, low refractive index layer or the like. The resin layer may be formed by a known method in the prior art (such as application of a composition containing the resin component).

Unless otherwise specified, the term "resin" according to the invention includes the concept of curable precursors of monomers, oligomers, prepolymers and the like.

An additional layer (such as a low refractive index layer) may be formed after step (A3).

[Second Optical Laminate Manufacturing Method]

In this method of manufacturing an optical laminate comprises step (B1) in which the substrate is coated with a solvent capable of swelling or dissolving the substrate, as the first step. This allows the substrate to be swelled or dissolved by the solvent.

In step (B1), the substrate is not particularly limited so long as it can be coated with a solvent capable of swelling or dissolving the substrate, and it may also be an optically transparent substrate material, hard coat layer or the like as in the first manufacturing method. The solvent capable of swelling or dissolving the substrate is a solvent that is able to permeate, swell, wet or dissolve the substrate, similarly to the solvent described for the first manufacturing method. The method of coating the solvent may be a coating method similar to one for the first manufacturing method.

In step (B1), coating of the solvent capable of swelling or dissolving the substrate is preferably followed by formation of irregularities on the surface of the substrate. This can help prevent drawbacks in step (B4), as explained above.

Step (B1) is followed by a drying step if necessary before step (B2).

Step (B1) is followed by step (B2) in which the composition (b) containing the functional material and diluting solvent is coated. This allows the functional material to be placed on the surface of the substrate that has been coated with the composition (b).

The functional material used in step (B1) may be an antistatic agent, high refractive index agent or the like, as explained for the first manufacturing method.

The diluting solvent is not particularly limited so long as it is a solvent capable of dispersing the functional material in the composition (b), and any known one in the prior art may be used. It has conventionally been necessary to select the diluting solvent to be one that dissolves and swells the substrate in order to fix and bond the material to the substrate and improve productivity, but the present method requires no selection of the solvent.

In order for the function of the functional material to be adequately exhibited, it is preferred that the functional materials be densely placed on the substrate without infiltration of the functional materials into the substrate; therefore, a solvent that does not dissolve or swell the substrate is rather preferably used. It is a feature of this method that a solvent which does not dissolve or swell the substrate can be used.

As examples of such diluting solvents to be appropriately employed, there may be mentioned: alcohols such as methanol, ethanol, isopropanol, butanol and octanol; aromatic hydrocarbons such as benzene, toluene, xylene and ethylbenzene; and ketones such as methyl isobutyl ketone, excluding acetone, methyl ethyl ketone, cyclohexanone and cyclopentanone; and in addition, butyl acetate, γ-butyrolactone, propyleneglycol monomethyl ether acetate, propyleneglycol monoethyl ether acetate, ethyleneglycol monomethyl ether, propyleneglycol monomethyl ether, diethyleneglycol monobutyl ether and the like.

One of the solvents or a mixture of two or more thereof may be used. When the functional material is an organic conductive material, the solvent is preferably an aqueous solvent such as water, a solvent comprising a mixture of water and a water-soluble organic solvent, or a water-compatible solvent such as an alcohol-based, glycol ether-based or pyrrolidone-based solvent.

The method of coating the composition (b) may be a coating method similar to one for the first manufacturing method.

Step (B2) is followed by a drying step (B3). This accomplishes drying and evaporation of the diluting solvent used in step (B2) or the solvent that swells or dissolves the substrate used in step (B1).

The method of drying in step (B3) may be carried out by a known method in the prior art, and for example, it may be a method of heating at 50-80° C. for 30-600 seconds.

Step (B3) is followed by step (B4) in which a resin layer is formed on the substrate that has been coated with the composition (b) (the side of the substrate on which the composition (b) has been coated). This covers the functional material on the substrate with the resin layer, thus fixing it to the substrate.

The resin layer may be a hard coat layer, high refractive index layer or the like, as in the first manufacturing method. The resin layer may be formed by a known method in the prior art (such as application of a composition containing the resin component).

The embodiments for the first and second manufacturing methods of the invention will now be explained in more detail with reference to the accompanying drawings, with the understanding that the manufacturing methods of the invention are not limited to manufacturing of laminates with the structures.

The manufacturing method of the invention can produce (1) a laminate comprising an optically transparent substrate material 1 (substrate), a hard coat layer 2 (resin layer) and a low refractive index layer 3 laminated in that order, with an antistatic agent 4 (functional material) sandwiched and fixed between the optically transparent substrate material 1 and the hard coat layer 2 (FIG. 1), and (2) a laminate comprising an optically transparent substrate material 1, a hard coat layer 2 (substrate) and a low refractive index layer 3 laminated in that order, with a high refractive index agent 5 sandwiched and fixed between the hard coat layer 2 and the low refractive index layer 3 (FIG. 2).

As shown in the figures, the raised areas have no or a small amount of the functional material. It is only at these locations that the functional materials are not in contact with each other. However, presumably the intermolecular forces and Coulomb forces between the functional materials placed on the surfaces of the recesses impart functionality to the raised areas as well, so that the function of the obtained optical laminate is satisfactorily exhibited.

FIGS. 1 and 2 schematically show irregularities in a uniform manner, but the actual form will be random with dome-shaped craters of various sizes and depths, as shown in FIG. 3. The larger craters have diameters of a few hundred nm to about 2 mm, and numerous microcraters are also present over the entire surface with the recesses and the raised areas. The depths will be from several nm to a maximum of 3 μm.

Thus, the presence of random uneven craters allows coating of the functional material to about 10-500 nm. Since the functional material is usually coated to 100 nm or greater, it is assumed that all of the small irregularities become filled and the functional material is placed essentially evenly at those sections. Even if the small craters become filled with the functional material, the presence of the other large raised areas allows a windable film to be produced without a binder. It is believed that the function of the large raised areas does not pose a problem, for the reasons explained above.

Moreover, although the irregularities are random, they are at such a level so as not to affect the transmittance or haze that is critical to an optical film.

In contrast, FIG. 4 shows irregularities with which suitable production in terms of rolling cannot be performed. These are irregularities of various sizes with a certain degree of randomness. However, the differences in depth are at most about 500 nm, instead of the large difference in depth shown in FIG. 3, while dome-shaped craters and microcraters on the surfaces of the irregularities are also not present.

In order to obtain a form that can physically hold the functional material, therefore, it is important to select a solvent that can dissolve and swell the substrate.

The manufacturing method for obtaining the optical laminate shown in FIG. 1 (the first manufacturing method described above) comprises a step (A1) of coating an optically transparent substrate material (substrate) with a composition (a) containing an antistatic agent (functional material) and a solvent capable of swelling or dissolving the optically transparent substrate material, a step (A2) of drying and a step (A3) of forming a hard coat layer (resin layer) on the coated optically transparent substrate material.

In this manufacturing method, the optically transparent substrate material corresponds to the substrate, the antistatic agent corresponds to the functional material and the hard coat layer corresponds to the resin layer. Steps (A1)-(A3) can be carried out by following the method described above. The optical laminate shown in FIG. 1, after step (A1) having been performed, has irregularities formed on the surface of the optically transparent substrate material (substrate) (on the hard coat layer side).

The optically transparent substrate material is preferably smooth and heat resistant, with excellent mechanical strength. As materials for forming the optically transparent substrate material, there may be mentioned thermoplastic resins such as acrylic compounds (polymethyl methacrylate), polyesters (polyethylene terephthalate, polyethylene naphthalate), cellulose triacetate, cellulose diacetate, cellulose acetate butyrate, polyesters, polyamides, polyimides, polyethersulfones, polysulfones, polypropylene, polymethylpentene, polyvinyl chloride, polyvinylacetal, polyetherketone, polymethyl methacrylate, polycarbonates and polyurethanes, among which polyesters (polyethylene terephthalate, polyethylene naphthalate) and cellulose triacetate are preferred. From the standpoint of satisfactorily obtaining the effect of the invention, cellulose triacetate is most preferred.

As other examples for the optically transparent substrate material, there may be mentioned films of amorphous olefin polymers with acyclic structures (Cyclo-Olefin-Polymer: COP), as substrates with which resins such as norbornane-based polymers, monocyclic olefin-based polymers, cyclic conjugated diene-based polymers, vinyl alicyclic and hydrocarbon-based polymers may be used: examples include ZEONEX or ZEONOR (norbornane-based resin) by Zeon Corp., SUMILITE FS-1700 by Sumitomo Bakelite Co., Ltd., ARTON (modified norbornane-based resin) by JSR Corp., APEL (cyclic olefin copolymer) by Mitsui Chemicals, Inc., Topas (cyclic olefin copolymer) by Ticona and the OPTOREZ OZ-1000 series (alicyclic acrylic resins) by Hitachi Chemical Co., Ltd.

Preferred as triacetylcellulose substitute substrates are the FV Series (low birefringence, low optical elastic modulus films) by Asahi Kasei Corp.

The optically transparent substrate material may be suitably used as a film having the high flexibility of the aforementioned thermoplastic resins, but for use forms that require curability, these thermoplastic resins may also be used in the form of boards, or a glass plate may be used.

The thickness of the optically transparent substrate material is preferably from 20 μm to 300 μm, more preferably with the lower limit being 30 μm and the upper limit being 200 μm. If the optically transparent substrate material is a board, the thickness may be in a range exceeding this range, i.e., from 300 μm to 1 cm. During formation of the hard coat layer, the substrate may be subjected to physical treatment such as corona discharge treatment or oxidation treatment, or coating with a coating agent such as an anchoring agent or primer may be carried out in advance, in order to improve the adhesive property. The substance composing the optically transparent substrate material may be any one that is transparent to visible light, and it may be colorless transparent or colored and transparent. It may also, instead be semi-transparent.

The antistatic agent is conductive, and its addition can prevent adhesion of dust onto the optical laminate surface or inconveniences during production due to static electricity.

As the antistatic agents there may be mentioned: cationic compounds such as quaternary ammonium salts, pyridinium salts and primary-tertiary amino groups, anionic compounds such as sulfonate bases, sulfate bases, phosphate bases and phosphonate bases; amphoteric compounds such as amino acid-based and aminosulfuric acid ester-based compounds; non-ionic compounds such as amino alcohol-based, glycerin-based and polyethylene glycol-based compounds; organometallic compounds such as tin and titanium alkoxides; and metal chelate compounds such as acetylacetonate salts of the aforementioned organometallic compounds. The aforementioned compounds may also be high-molecularized compounds.

There may also be used as the antistatic agent, a polymerizable compound, such as a monomer or oligomer that has a tertiary amino group, quaternary ammonium or metal chelate group and is polymerizable by ionizing radiation, or an organometallic compound such as a coupling agent with functional groups.

Conductive polymers may also be mentioned as the antistatic agent. As the conductive polymers there may be mentioned aromatic conjugated poly(paraphenylene), heterocyclic conjugated polypyrrole, polythiophene, aliphatic conjugated polyacetylene, heteroatom-containing conjugated polyaniline, mixed conjugated poly(phenylenevinylene), multichain conjugated compounds that are conjugated systems with multiple conjugated chains in the molecule, and conductive complexes that are polymers obtained by graft or block polymerization of the aforementioned conjugated polymer chains to saturated polymers.

The antistatic agents may also be in the form of conductive metal oxide fine particles. As the conductive metal oxide fine particles, there may be mentioned ZnO (refractive index: 1.90) (values in parentheses below all represent refractive indexes), $Sb_2O_2$ (1.71), $SnO_2$ (1.997), $CeO_2$ (1.95), indium tin oxide (abbreviated as ITO, 1.95), $In_2O_3$ (2.00), $Al_2O_3$ (1.63), antimony-doped tin oxide (abbreviated as ATO, 2.0), aluminum-doped zinc oxide (AZO, 2.0) and the like.

Fine particles are particles with submicron sizes, i.e. mean particle sizes of not more than one micron, and the mean particle size is preferably 0.1 nm-0.1 μm from the viewpoint of producing an ink that can form a highly transparent film with virtually no haze when ultrafine particles are dispersed in a binder. The mean particle sizes of the conductive metal oxide fine particles may be measured by the dynamic light scattering method.

When using ultrafine particles as an inorganic functional material for conductive metal oxide fine particles or the like, the coating solution preferably has sufficient dispersion stability to facilitate storage for prolonged periods. Although ultrafine particles present a problem of tending to aggregate by themselves, this can be overcome by using a dispersing agent that exhibits satisfactory dispersibility for the ultrafine particles. The dispersing agent adsorbs onto the fine particle surfaces while infiltrating between the aggregating fine particles, thus breaking up the aggregates during dispersion treatment and producing a uniform dispersion in the solvent.

The dispersing agent used may be an anionic, nonionic or cationic agent.

Compounds represented by the following formula are examples of such dispersing agents.

[Chemical Formula 1]

(1)

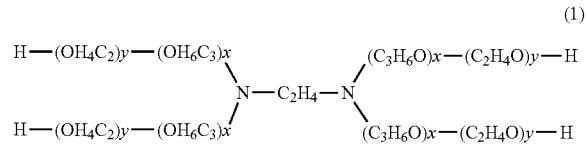

The repeating unit numbers x and y are each integers of 1-120, and the weight-average molecular weight of the compound of formula (1) is preferably 1000-30,000.

As commercially available dispersing agents according to formula (1), there may be mentioned EMULGEN 105, RHEODOL SP-010 and NEOPELEX No. 6 by Kao Corp., ADEKA PLURONIC TR-701, TR-702 and TR-704 by Adeka Corp., and PLAAD ED211 by Kusumoto Chemicals, Ltd.

There may also be used polyglycerin fatty acid esters, sorbitan fatty acid esters, sucrose fatty acid esters and other higher fatty acid esters. For a polyglycerin fatty acid ester, the polyglycerin may include α-fused linear polyglycerin as well as partially β-fused branched polyglycerin and cyclic polyglycerin. The polyglycerin composing the polyglycerin fatty acid ester preferably has a weight-average polymerization degree of about 2-20 and more preferably about 2-10, in order to obtain a more satisfactory dispersed state. As fatty acids there are preferred branched or straight-chain saturated or unsaturated fatty acids, among which preferred examples include aliphatic monocarboxylic acids such as caproic acid, enanthylic acid, caprylic acid, nonanoic acid, capric acid, lauric acid, myristic acid, behenic acid, palmitic acid, isostearic acid, stearic acid, oleic acid, isononanoic acid and arachic acid. Commercially available polyglycerin fatty acid esters that may be used as higher fatty acid esters include AJISPER-PN-411 and PA-111 by Ajinomoto Co., Inc., and SY GLYSTER by Sakamoto Yakuhin Kogyo Co., Ltd.

There may also be used different sulfonic acid amide-based, ∈-caprolactone-based, hydrostearic acid-based, polycarboxylic acid-based and polyester-based dispersing agents. As the dispersing agents with anionic polar groups there may be used compounds having a molecular structure with anionic polar group side chains or anionic polar group-containing side chains on the main chain of an ethylene oxide chain backbone, with weight-average molecular weights of 2,000-20,000. Carboxyl, phosphate and hydroxyl groups correspond to the anionic polar groups, for example. As specific commercial products there may be mentioned SOLPAS 3000, 9000, 17,000, 20,000, 24,000 and 41090 (products of Zeneca) and Disperbyk-161, -162, -163, -164, Disperbyk-108, 110, 111, 112, 116, 140, 170, 171, 174, 180, 182 and 220S (products of Byk-Chemie Corp.).

The dispersing solvent may be appropriately selected from the solvents described for the first optical laminate manufacturing method or the second optical laminate manufacturing method.

The method of dispersing the functional material may be any of a variety of dispersing methods to be able to carry out dispersion. For example, a pulverizer such as an ultrasonic mill, bead mill, sand mill, disk mill or the like may be used.

By using a minimum amount of dispersing agent, it is possible to stabilize the dispersibility of the ultrafine particles and achieve a smooth coated film surface, in order to produce a highly transparent condition suitable for optical purposes. Since no binder is used during this dispersion, it is possible to place the functional materials as closely together as possible for a film state adapted to optical purposes, thereby allowing the maximum function inherent in the material to be exhibited. For a conductive functional material, the surface resistance value can be improved by 3 to 6 figures of $\Omega/\square$ (for example, from $1\times10^{12}$ to $1\times10^{6}\Omega/\square$), compared to the prior art using a binder. The dispersing agent is preferably added to the functional material at 0-30 wt %, and a smaller amount of addition is preferred for increased bonding of the functional material.

If the functional material is organic-based, any dispersing agent will generally not be necessary; but it may be used to improve optical performance.

The solvent capable of swelling or dissolving the optically transparent substrate material is one that is capable of permeating, swelling, wetting or dissolving the optically transparent substrate material, and as examples there may be mentioned ketones (acetone, methyl ethyl ketone, cyclohexanone, diacetone alcohol); esters (methyl formate, methyl acetate, ethyl acetate); nitrogen-containing compounds (nitromethane, acetonitrile, N-methylpyrrolidone, N,N-dimethylformamide); glycols (ethyleneglycol, propylene glycol); ethers (tetrahydrofuran, 1,4-dioxane, dioxolane, ethylpropyl ether); halogenated hydrocarbons (methylene chloride, chloroform) and glycol ethers (methylcellosolve, ethylcellosolve); in addition, dimethyl sulfoxide, propylene carbonate and the like; and mixtures of the foregoing, among which esters and ketones (methyl acetate, ethyl acetate, methyl ethyl ketone, cyclohexanone, cyclopentanone) and the like are preferred. In addition, there may be used mixtures of the aforementioned solvents with alcohols such as methanol, ethanol, isopropyl alcohol, butanol, isobutyl alcohol and 2-methoxyethanol, aromatic hydrocarbons such as toluene and xylene, or methyl isobutyl ketone or butyl acetate that will not swell or dissolve the substrate material among ketones or esters.

The solvent capable of swelling or dissolving the optically transparent substrate material may be selected according to the type of substrate material used, and when the substrate material is cellulose triacetate, it is preferably an ester or ketone.

The weight-average molecular weight of an ester or ketone solvent is preferably less than 100, and more preferably 50-100. If it is greater than 100, the permeability, swelling property and solubility to the substrate may be reduced.

More preferred are methyl ethyl ketone, ethyl acetate, methyl acetate, cyclohexanone and cyclopentanone; and cyclohexanone is particularly preferred as the solvent with a good balance between the strength of attack of the solvent on the substrate material and the drying speed of the solvent, and also satisfactory productivity. This will allow suitable swelling or dissolving of the optically transparent substrate material, so that the object described above can be satisfactorily achieved.

The hard coat layer formed in the manufacturing method (step (A3)) described above is a transparent layer that can provide hardness or an antiglare property.

The hard coat layer can be formed by coating the surface of the antistatic agent-placed optically transparent substrate material with a hard coat layer-forming composition containing a resin composition.

The resin composition may be a binder resin for use.

Transparent binder resins are preferred as the binder resin, and as examples there may be mentioned ionizing radiation curing resins that harden with ultraviolet rays or an electron beam, and mixtures of ionizing radiation curing resins and solvent dried resins, or thermosetting resins. Most preferred are ionizing radiation curing resins.

As the ionizing radiation curing resins, there may be mentioned compounds with one or more unsaturated bonds such as compounds with acrylate-based functional groups. As examples of the compounds with one unsaturated bond, there may be mentioned ethyl(meth)acrylate, ethylhexyl(meth) acrylate, styrene, methylstyrene, N-vinylpyrrolidone and the like. As examples of the compounds with two or more unsaturated bonds there may be mentioned reaction products of (meth)acrylates with polyfunctional compounds, (for example, poly(meth)acrylate esters of polyhydric alcohols), such as polymethylolpropane tri(meth)acrylate, hexanediol (meth)acrylate, tripropyleneglycol di(meth)acrylate, diethyleneglycol di(meth)acrylate, pentaerythritol tri(meth)acrylate, dipentaerythritol hexa(meth)acrylate, 1,6-hexanediol di(meth)acrylate and neopentylglycol di(meth)acrylate. Throughout the present specification, the term "(meth)acrylate" means methacrylate and acrylate.

The ionizing radiation curing resin to be used may be, in addition to the aforementioned compounds, a relatively low molecular weight polyester resin, polyether resin, acrylic resin, epoxy resin, urethane resin, alkyd resin, spiroacetal resin, polybutadiene resin, polythiolpolyene resin or the like with an unsaturated double bond.

When the ionizing radiation curing resin is used as an ultraviolet curing resin, it is preferred to add a photopolymerization initiator or photopolymerization accelerator to the hard coat layer-forming composition. When a radical-polymerizing unsaturated group-containing resin is used as the aforementioned photopolymerization initiator, it is an acetophenone (for example, 1-hydroxy-cyclohexyl-phenyl-ketone which is marketed under the trade name IRGACURE 184 (Ciba Specialty Chemicals Co., Ltd.)), benzophenones, thioxanthones, benzoin, benzoinmethyl ether or the like, which may be used either alone or in combination.

When a resin with a cationic polymerizable functional group is used, the photopolymerization initiator is an aromatic diazonium salt, aromatic sulfonium salt, aromatic iodonium salt, metallocene compound, benzoinsulfonic acid ester or the like, which may be used either alone or in combination.

The amount of photopolymerization initiator added is preferably 0.1-10 parts by mass relative to 100 parts by solid mass of the ionizing radiation curing resin.

The ionizing radiation curing resin may be used together with a solvent-dried resin (a resin (polymer) that forms a coating film merely by drying the solvent added to adjust the solid content during coating).

A thermoplastic resin may be used as the solvent-dried resin when it is used together with the ionizing radiation curing resin. Using the solvent-dried resin therewith can effectively prevent defects in the coating film on the coated side and can produce a more excellent luster quality.

As the thermoplastic resins there may be mentioned styrene-based resins, (meth)acrylic resins, vinyl acetate-based resins, vinyl ether-based resins, halogen-containing resins, alicyclic olefin-based resins, polycarbonate-based resins, polyester-based resins, polyamide-based resins, cellulose derivatives, silicone-based resins and rubber or elastomer compounds.

The thermoplastic resins are preferably amorphous and soluble in organic solvents (especially solvents that can dissolve plural polymers or curable compounds). Particularly preferred from the viewpoint of film formability, transparency and weather resistance are styrene-based resins, (meth)acrylic resins, alicyclic olefin-based resins, polyester-based resins, cellulose derivatives (cellulose esters, etc.) and the like.

When the optically transparent substrate material is a cellulose-based resin such as triacetylcellulose (TAC), examples of preferred thermoplastic resins include cellulose-based resins such as nitrocellulose, acetylcellulose, cellulose acetate propionate and ethylhydroxyethylcellulose. Using a cellulose-based resin can improve the transparency and the adhesiveness with the optically transparent substrate material.

In addition to cellulose derivatives such as acetylcellulose, nitrocellulose, acetylbutylcellulose, ethylcellulose and methylcellulose, there may also be mentioned vinyl-based resins including vinyl acetate and its copolymers, vinyl chloride and its copolymers, vinylidene chloride and its copolymers, acetal resins such as polyvinyl formal and polyvinyl butyral, acrylic-based resins including acrylic resins and their copolymers, methacrylic resins and their copolymers, and polystyrene resins, polyamide resins, polycarbonate resins and the like.

As the thermosetting resins which can be used as the binder resin, there may be mentioned phenol resins, urea resins, diallyl phthalate resins, melanin resins; guanamine resins, unsaturated polyester resins, polyurethane resins, epoxy resins, aminoalkyd resins, melamine-urea co-condensed resins, silicon resins, polysiloxane resins and the like. When a thermosetting resin is used, a curing agent such as a crosslinking agent or polymerization initiator, or a polymerization promoter, solvent, viscosity modifier or the like may also be used in combination if necessary.

Preferred coating solvents to be included in the hard coat layer forming composition include ketones, esters and aromatic hydrocarbons. Using a ketone-based solvent in particular can further enhance the adhesiveness between the hard coat layer and the triacetylcellulose surface (optically transparent substrate material). The most preferred coating solvents are methyl ethyl ketone, methyl isobutyl ketone and cyclohexanone. These coating solvents may also contain solvents other than ketone-based solvents.

The hard coat layer forming composition may further contain added resin, inorganic fine particles, organic fine particles, a dispersing agent, surfactant, antistatic agent, silane coupling agent, thickener, anti-staining agent, coloring agent (pigment, dye), antifoaming agent, leveling agent, flame retardant, ultraviolet absorber, tackifier, polymerization inhibitor, antioxidant, surface modifier and the like, for the purpose of increasing the hardness of the hard coat layer, inhibiting cure shrinkage, controlling the refractive index or imparting an antiglare property.

After the hard coat layer forming composition has been coated, it is preferably subjected to drying and active energy ray exposure to form the hard coat layer. As active energy exposure there may be mentioned ultraviolet rays or electron beam irradiation.

As the ultraviolet ray sources there may be mentioned light sources such as an ultra-high-pressure mercury lamp, high-pressure mercury lamp, low-pressure mercury lamp, carbon arc lamp, black light fluorescence lamp, metal halide lamp and the like. The wavelength of the ultraviolet rays may be in a wavelength range of 190-380 nm. As the electron beam sources there may be mentioned various types of electron beam accelerators such as a Cockoroft-Walton, van de Graaff, resonance transformer, insulated core transformer, linear, dynamitron or high-frequency type.

The thickness of the hard coat layer may be designed according to the purpose of use, but for general purposes it is preferably 0.1-100 μm and more preferably 0.8-20 μm.

The strength of the hard coat layer is preferably H or greater, more preferably 2H or greater and even more preferably 3H or greater, according to the Pencil Hardness Test of JIS K5400. In the Taper Test of JIS K5400, a lower amount of abrasion of the test piece during the test is preferred.

The optical laminate shown in FIG. 1 has a low refractive index layer further formed on the hard coat layer (resin layer).

The low refractive index layer preferably has a lower refractive index than the hard coat layer.

According to a preferred embodiment of the invention, its construction is preferably such that the refractive index of the hard coat layer is 1.5 or greater and the refractive index of the low refractive index layer is less than 1.5 and preferably 1.45 or less.

The low refractive index layer is composed of any one of (1) a resin containing silica or magnesium fluoride, (2) a fluorine-based resin as a low refractive index resin, (3) a fluorine-based resin containing silica or magnesium fluoride and (4) a silica or magnesium fluoride thin-film.

The fluorine-based resin is a polymerizable compound containing at least one fluorine atom in the molecule, or its polymer. The polymerizable compound is preferably one having a functional group that hardens by ionizing radiation (ionizing radiation curing group) or a curing reactive group such as a polar group that hardens by heat (thermosetting polar group). Compounds with such reactive groups in combination may also be adequate.

Fluorine-containing monomers with ethylenic unsaturated bonds are widely used as polymerizable compounds having fluorine-containing ionizing radiation curing groups. More specifically, examples include fluoroolefins (such as fluoroethylene, vinylidene fluoride, tetrafluoroethylene, hexafluoropropylene, perfluorobutadiene and perfluoro-2,2-dimethyl-1,3-dioxole). (Meth)acryloyloxy group-containing compounds include (meth)acrylate compounds having fluorine atoms in the molecule, such as 2,2,2-trifluoroethyl(meth)acrylate, 2,2,3,3,3-pentafluoropropyl(meth)acrylate, 2-(perfluorobutyl)ethyl(meth)acrylate, 2-(perfluorohexyl)ethyl(meth)acrylate, 2-(perfluorooctyl)ethyl(meth)acrylate, 2-(perfluorodecyl)ethyl(meth)acrylate, α-trifluoromethyl methacrylate and α-trifluoroethyl methacrylate; and fluorine-containing polyfunctional (meth)acrylic acid ester compounds having a $C_{1-14}$ fluoroalkyl, fluorocycloalkyl or fluoroalkylene group with at least three fluorine atoms and at least two (meth)acryloyloxy groups in the molecule.

Polymerizable compounds with fluorine atom-containing thermosetting polar groups include 4-fluoroethylene-perfluoroalkylvinyl ether copolymers; fluoroethylene-hydrocarbon-based vinyl ether copolymers; and fluoro-modified epoxy, polyurethane, cellulose, phenol and polyimide resins. As the thermosetting polar groups there are preferably mentioned hydrogen bond-forming groups such as hydroxyl, carboxyl, amino and epoxy groups. These are not only adhesive with coated films, but also have high affinity with inorganic ultrafine particles such as silica.

Examples of polymerizable compounds (fluorine-based resins) with both ionizing radiation curing groups and thermosetting polar groups include fully or partially fluorinated alkyl, alkenyl and aryl esters of acrylic or methacrylic acid, fully or partially fluorinated vinyl ethers, fully or partially fluorinated vinyl esters, and fully or partially fluorinated vinylketones.

As the polymers of fluorine atom-containing polymerizable compounds, there may be mentioned polymers of monomer mixtures comprising at least one fluorine-containing (meth)acrylate compound of the aforementioned polymerizable compounds with ionizing radiation curing groups; copolymers of at least one fluorine-containing (meth)acrylate compound with a (meth)acrylate compound containing no fluorine atoms in the molecule such as methyl(meth)acrylate, ethyl(meth)acrylate, propyl(meth)acrylate, butyl(meth)acrylate or 2-ethylhexyl(meth)acrylate; and homopolymers or copolymers of fluorine-containing monomers such as fluoroethylene, vinylidene fluoride, trifluoroethylene, chlorotrifluoroethylene, 3,3,3-trifluoropropylene, 1,1,2-trichloro-3,3,3-trifluoropropylene and hexafluoropropylene.

Silicone-containing vinylidene fluoride copolymers obtained by including a silicone component in these copolymers may also be used as polymers of polymerizable compounds. In this case, examples of such silicone components include (poly)dimethylsiloxanes, (poly)diethylsiloxanes, (poly)diphenylsiloxanes, (poly)methylphenylsiloxanes, alkyl-modified (poly)dimethylsiloxanes and azo group-containing (poly)dimethylsiloxanes, as well as dimethylsilicone, phenylmethylsilicone, alkyl/aralkyl-modified silicones, fluorosilicones, polyether-modified silicones, fatty acid ester-modified silicones, methyl hydrogen silicone, silanol group-containing silicones, alkoxy group-containing silicones, phenol group-containing silicones, methacryl-modified silicones, acryl-modified silicones, amino-modified silicones, carboxylic acid-modified silicones, carbinol-modified silicones, epoxy-modified silicones, mercapto-modified silicones, fluorine-modified silicones, polyether-modified silicones and the like. Compounds with dimethylsiloxane structures are preferred among the above.

As the fluorine-based resins there may also be used compounds obtained by reacting fluorine-containing compounds having at least one isocyanato group in the molecule with compounds having at least one functional group that reacts with the isocyanato group, such as an amino, hydroxyl or carboxyl group, in the molecule, and compounds obtained by reacting fluorine-containing polyols such as fluorine-containing polyether polyols, fluorine-containing alkyl polyols, fluorine-containing polyester polyols and fluorine-containing ∈-caprolactone-modified polyols with compounds containing isocyanato groups.

The low refractive index layer may be formed using a composition containing the starting components (low refractive index layer-forming composition). More specifically, a solution or dispersion containing the starting components (resin, etc.) and necessary additives (for example, "fine particles with voids" described hereunder, a polymerization initiator, antistatic agent, antiglare agent, etc.) dissolved or dispersed in a solvent may be used as a low refractive index layer-forming composition to form a coated film with the composition, and the coated film is cured to obtain a low refractive index layer. Additives such as a polymerization initiator, antistatic agent and anti-glare agent are not particularly limited, and any known ones may be mentioned.

The solvent to be included in the low refractive index layer-forming composition may be any suitably usable one capable of dissolving or dispersing the low refractive index material, such as methyl isobutyl ketone, cyclohexanone, isopropyl alcohol (IPA), n-butanol, t-butanol, diethylketone or PGME.

The method of preparing the low refractive index layer-forming composition may be carried out according to a method known in the prior art that allows uniform mixing of the components. For example, it may be prepared by the method described for preparation of the composition (a).

The method of forming the coating film may also be according to a known method. For example, the same method used to form the hard coat layer described above may be employed. The curing method for the coated film may appropriately be selected depending on the content of the composition. For an ultraviolet curing type, for example, the coated film may be irradiated with ultraviolet rays for curing.

For the low refractive index layer, fine particles with voids are preferably used as the low refractive index agent. Fine particles with voids can maintain the hard coat layer strength while lowering the refractive index. According to the invention, by the fine particles with voids are meant fine particles having a structure with the fine particle interiors filled with gas and/or a porous structure containing gas to be formed, which have lower refractive indexes in inverse proportion to the gas occupancy in the fine particles, as compared to the refractive indexes of the original fine particles.

The invention also encompasses fine particles that can form a nanoporous structure in at least part of the interior and/or surface, by the form, structure, aggregated state and dispersed state of the fine particles in the coating film interior. The low refractive index layer employing such fine particles can have its refractive index adjusted to 1.30-1.45.

As examples of the inorganic fine particles with voids, there may be mentioned silica fine particles prepared by the method described in Japanese Patent Laid-open (Kokai) Publication No. 2001-233611. There may also be mentioned silica fine particles obtained by the methods described in Japanese Patent Laid-open (Kokai) Publication HEI No. 7-133105, Japanese Patent Laid-open (Kokai) Publication No. 2002-79616, Japanese Patent Laid-open (Kokai) Publication No. 2006-106714 and elsewhere. Because silica fine particles with voids are easy to produce and exhibit high hardness, they improve the layer strength and allow adjustment of the refractive index to a range of about 1.20-1.45 when mixed with a binder to form the low refractive index layer.

As the organic fine particles with voids, there may particularly be mentioned hollow polymer fine particles prepared by the technique disclosed in Japanese Patent Laid-open (Kokai) Publication No. 2002-80503.

In addition to the aforementioned silica fine particles as fine particles allowing formation of a nanoporous structure in at least part of the coating film interior and/or surface, there may also be mentioned release materials that are prepared to increase specific surface area and that adsorb chemical substances onto packing columns and surface porous sections and, porous fine particles used to immobilize the catalyst, and dispersions or aggregates of hollow fine particles to be incorporated into heat insulating materials or low dielectric materials.

Specifically, there may be used porous silica fine particle aggregates such as Nipsil or Nipgel, trade names of Nippon Silica Industries Co., Ltd., the colloidal silica UP Series (trade name) by Nissan Chemical Industries, Ltd., having a structure with silica fine particles linked in a chain fashion, among which particles with sizes within the preferred ranges of the invention may be used.

The mean particle sizes of the fine particles with voids are from 5 nm to 300 nm, preferably with the lower limit being not less than 8 nm and the upper limit being not greater than 100 nm, and even more preferably with the lower limit being not less than 10 nm and the upper limit being not greater than 80 nm. If the mean particle sizes of the fine particles are within these ranges, the hard coat layer will be imparted with excellent transparency.

The mean particle sizes of the particles referred to throughout the present specification are the values measured by the dynamic light scattering method. The fine particles with voids are generally present at about 0.1-500 parts by mass and preferably 10-200 parts by mass relative to 100 parts by mass of the matrix resin in the low refractive index layer.

For formation of the low refractive index layer, the viscosity of the low refractive index layer-forming composition is preferably in a range of 0.5-5 cps (25° C.) and preferably 0.7-3 cps (25° C.), which will result in satisfactory coatability. This will allow formation of an excellent antireflection film against visible light as a uniform thin-film without unevenness of coating, while also producing a low refractive index layer with excellent adhesiveness for the substrate.

The means for curing the resin may be the same as described above. When heating means is used as the curing means, a thermopolymerization initiator that generates radicals and initiates polymerization of the polymerizable compound upon heating is preferably added to a fluorine-based resin composition.

The film thickness (nm) $d_A$ of the low refractive index layer preferably satisfies the following formula (I):

$$d_A = m\lambda/(4n_A) \quad (I)$$

(wherein $n_A$ represents the refractive index of the low refractive index layer, m represents an odd integer and preferably 1, and λ is the wavelength which is preferably in the range of 480-580 nm.)

From the viewpoint of achieving low reflectance for the invention, the low refractive index layer preferably satisfies the following numerical formula (II):

$$120 < n_A d_A < 145 \quad (II)$$

The manufacturing method for obtaining the optical laminate shown in FIG. 1 (the second manufacturing method described above) comprises a step (B1) of coating an optically transparent substrate material (substrate) with a solvent capable of swelling or dissolving the optically transparent substrate material, a step (B2) of coating with a composition (b) containing an antistatic agent (functional material) and a diluting solvent, a step (B3) of drying and a step (B4) of forming a hard coat layer (resin layer) on the coated optically transparent substrate material. In this manufacturing method, the optically transparent substrate material corresponds to the substrate, the antistatic agent corresponds to the functional material and the hard coat layer corresponds to the resin layer. Steps (B1)-(B4) can be carried out by following the method described above.

The optically transparent substrate material, the solvent capable of swelling or dissolving the optically transparent substrate material, the antistatic agent and the hard coat layer are the same as described above.

The manufacturing method for obtaining the optical laminate shown in FIG. 2 (the first manufacturing method) comprises a step (A1) of coating a hard coat layer formed on an optically transparent substrate material (substrate) with a composition (a) containing a solvent capable of swelling or dissolving the hard coat layer and a high refractive index agent (functional material), a step (A2) of drying and a step (A3) of forming a low refractive index layer (resin layer) on the coated hard coat layer.

In this manufacturing method, the two layers (optically transparent substrate material/hard coat layer) correspond to the substrate, the high refractive index agent corresponds to the functional material and the low refractive index layer corresponds to the resin layer. Steps (A1)-(A3) can be carried out by following the method described above. The optical laminate shown in FIG. 2, after step (A1) having been carried out, has irregularities formed on the surface of the optically transparent substrate material/hard coat layer (substrate) (on the low refractive index layer side).

The optically transparent substrate material, the hard coat layer and the low refractive index layer are the same as described above.

The high refractive index agent may be high refractive index ultrafine particles known in the prior art (preferably ultrafine particles with a refractive index of 1.5 or greater).

As examples of ultrafine particles with a refractive index of 1.5 or greater, there may be mentioned oxides such as ZnO (refractive index: 1.90) (values in parentheses below all represent refractive indexes), $TiO_2$ (2.3-2.7), $CeO_2$ (1.95), $Sb_2O_5$ (1.71), $SnO_2$ (1.997), indium tin oxide usually abbreviated as ITO (1.95), antimony-doped indium tin oxide, $In_2O_3$ (2.00), $Y_2O_3$ (1.87), $La_2O_3$ (1.95), $Al_2O_3$ (1.63), $HfO_2$ (2.00), $ZrO_2$ (2.05), and the like.

Among those, the use of $TiO_2$ is advantageous in that it allows a smaller amount of ultrafine particles to be added for control of the refractive index. Using $ZrO_2$ is especially preferred because $ZrO_2$ is optically inactive and has highly satisfactory light fastness and resistance to moist heat.

Oxide ultrafine particles with a refractive index of 1.5 or greater preferably have mean particle sizes of 2-100 nm and more preferably 5-30 nm.

By appropriate use of the dispersing agent described above, the high refractive index ultrafine particles can yield a coating composition with long-term stability. With a minimum amount of dispersing agent, it is possible to stabilize the dispersibility of the ultrafine particles and achieve such conditions as a smooth coated film surface and highly transparency adapted to optical purposes. Since no binder is used during dispersion, it is possible to place the functional materials as closely together as possible for a film suitable adapted to optical purposes, thereby exhibiting the maximum function inherent in the material. The solvents to be used may also be the same solvents as described above, and the dispersing method to be employed may be an ordinary method mentioned above.

The solvent capable of swelling or dissolving the hard coat layer may be any one that permeate, swells, wets or dissolves the hard coat layer, and there may be mentioned: alcohols such as isopropyl alcohol, methanol, ethanol, n-butanol and t-butanol; ketones such as acetone, methyl ethyl ketone, methyl isobutyl ketone, cyclohexanone and cyclopentanone; esters such as methyl acetate, ethyl acetate, butyl acetate and methyl formate; halogenated hydrocarbons; aromatic hydrocarbons such as toluene and xylene; and mixtures of the foregoing.

A solvent that does not permeate, swell or dissolve the hard coat layer may also be used in combination therewith.

The manufacturing method for obtaining the optical laminate shown in FIG. 1 (the second manufacturing method) comprises a step (B1) of coating a hard coat layer formed on an optically transparent substrate material (substrate) with a solvent capable of swelling or dissolving the hard coat layer, a step (B2) of coating the composition (b) containing a high refractive index agent (functional material) and a diluting solvent, a step (B3) of drying and a step (B4) of forming a low refractive index layer (resin layer) on the coated hard coat layer.

In this manufacturing method, the two layers (optically transparent substrate material/hard coat layer) correspond to the substrate, the high refractive index agent corresponds to the functional material and the low refractive index layer corresponds to the resin layer. Steps (B1)-(B4) can be carried out by following the method described above.

The optically transparent substrate material, the hard coat layer, the solvent capable of swelling or dissolving the hard coat layer surface, the high refractive index agent, the diluting solvent and the low refractive index layer may be the same as described above.

The manufacturing method of the invention comprises the steps described above but may also include a step of forming an optional antifouling layer or medium refractive index layer. The antifouling layer or medium refractive index layer may be formed by known methods for formation of such layers, with preparation of compositions containing a commonly employed antifouling agent, medium refractive index agent, resin and the like.

The manufacturing method of the invention may be, for example, applicable to the production in which an optically transparent substrate material/hard coat layer (two-layer substrate) and an antifouling layer (resin layer) are laminated in that order and a low refractive index agent (functional material) is sandwiched and fixed between the hard coat layer and the antifouling layer, the production in which an optically transparent substrate material/hard coat layer (two-layer substrate), a high refractive index layer (resin layer) and a low refractive index layer are laminated in that order and an medium refractive index agent (functional material) is sandwiched and fixed between the hard coat layer and the high refractive index layer, or the production in which an optically transparent substrate material/hard coat layer/medium refractive index layer (three-layer substrate) and a low refractive index layer (resin layer) are laminated in that order and a high refractive index agent (functional material) is sandwiched and fixed between the medium refractive index layer and the low refractive index layer.

The visible light transmittance of the optical laminate obtained by the manufacturing method of the invention is preferably 70% or greater. At less than 70% it will not be possible to ensure transparency, and therefore, the brightness or color reproducibility may be adversely affected when the laminate is mounted on a display. The visible light transmittance is more preferably 80% or greater, and even more preferably 90% or greater.

By providing an optical laminate obtained by the manufacturing method of the invention on the surface of a polarizing element, it is possible to obtain a polarizing plate. Such a polarizing plate is also within the scope of the invention.

There are no particular limitations on such a polarizing element, and for example, a polyvinyl alcohol film, polyvinyl formal film, polyvinylacetal film or ethylene-vinyl acetate copolymer-based saponified film that has been dyed with iodine or the like and stretched may be used.

For lamination of a polarizing element with the optical laminate of the invention, it is preferred to subject the optically transparent substrate material (preferably a triacetylcellulose film) to saponification. Saponification can result in satisfactory adhesiveness and an antistatic effect.

The invention also provides an image display device comprising the optical laminate or polarizing plate on its outermost surface. The image display device may be a non-selfluminous image display device such as an LCD, or a selfluminous image display device such as a PDP, FED, ELD (organic EL, inorganic EL), CRT or the like.

An LCD, as a typical example of the non-selfluminous type, has a transparent display member and a light source device that irradiates the transparent display member from its back. When the image display device of the invention is a LCD, an optical laminate or polarizing plate according to the invention is formed on the surface of the transparent display member.

When the invention is a liquid crystal display device having the aforementioned optical laminate, the light source of the light source device irradiates the optical laminate from its underside. A phase contrast plate may be inserted between the liquid crystal display element and the polarizing plate in an STN type liquid crystal display device. An adhesive layer may also be provided between the respective layers of the liquid crystal display device if necessary.

A PDP, as a selfluminous image display device, is provided with a surface glass substrate (having electrodes formed on the surface) and a discharge gas-encapsulating back glass substrate (having an electrode and fine surface groove formed on the surface, with red, green and blue phosphor layers in the grooves) disposed facing the surface glass substrate. When the image display device of the invention is a PDP, the optical laminate is provided on the surface of the surface glass substrate or its front cover (glass substrate or film sheet).

The selfluminous image display device may be an image display device such as an ELD device wherein an illuminant-a zinc sulfide or diamine substance that emits light upon application of voltage is vapor-deposited on a glass substrate and the voltage applied to the substrate is controlled for display, or a CRT that converts electrical signals to light to form viewable images. In this case, the optical laminate is provided on the surface of the display device or the surface of its front plate.

The image display device of the invention may be used for display in televisions, computers, word processors and the like. It is particularly suitable for use on the surfaces of high definition images displays such as a CRT, liquid crystal panel, PDP, ELD, FED or other displays.

Effect of the Invention

The optical laminate and manufacturing method according to the invention do not employ a binder material for bonding and fixing of functional materials such as antistatic agents and fine particles onto the substrate; therefore, the function of the functional material is adequately exhibited in the obtained laminate. In other words, the invention can yield an optical laminate capable of maximally exhibiting the function of the functional material (for example, an antistatic function or refractive index control) in order to achieve higher function.

Moreover, since no binder infiltrates between the functional materials in the optical laminate of the invention, it is possible to exhibit satisfactory function such as antistatic function, while also satisfactorily realizing natural color tones and especially black color tones. The optical laminate of the invention can, therefore, be suitably applied in cathode ray tube displays (CRT), liquid crystal displays (LCD), plasma displays (PDP), electroluminescence displays (ELD) and the like.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

EXPLANATION OF REFERENCE NUMERALS

1 Optically transparent substrate material
2 Hard coat layer
3 Low refractive index layer
4 Antistatic agent
5 High refractive index agent

DESCRIPTION OF THE PREFERRED EMBODIMENTS

This invention will now be explained in greater detail by the examples.

EXAMPLES

The following examples will now be explained for illustration of the invention, with the understanding that the scope of the invention is in no way intended to be restricted by these examples. Unless otherwise specified, the "parts" and "%" values are based on mass.

Example 1

Figure 1:
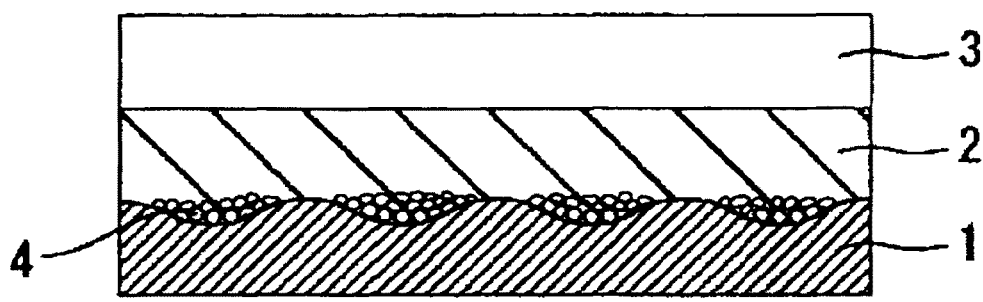
FIG. 1 shows a schematic view of an optical laminate obtained by the manufacturing method of the invention.
Figure 2:
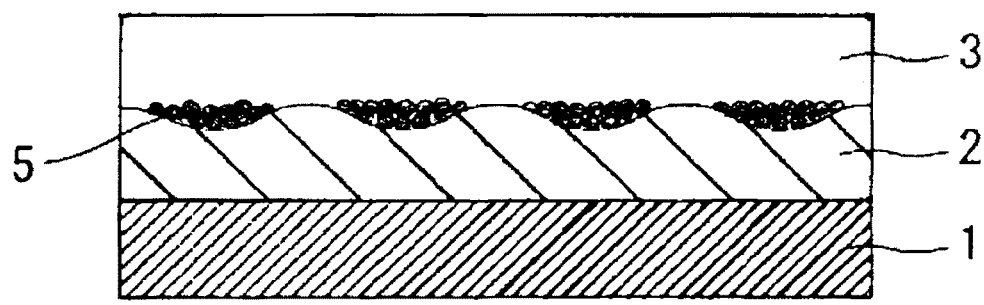
FIG. 2 shows a schematic view of an optical laminate obtained by the manufacturing method of the invention.
Figure 3:
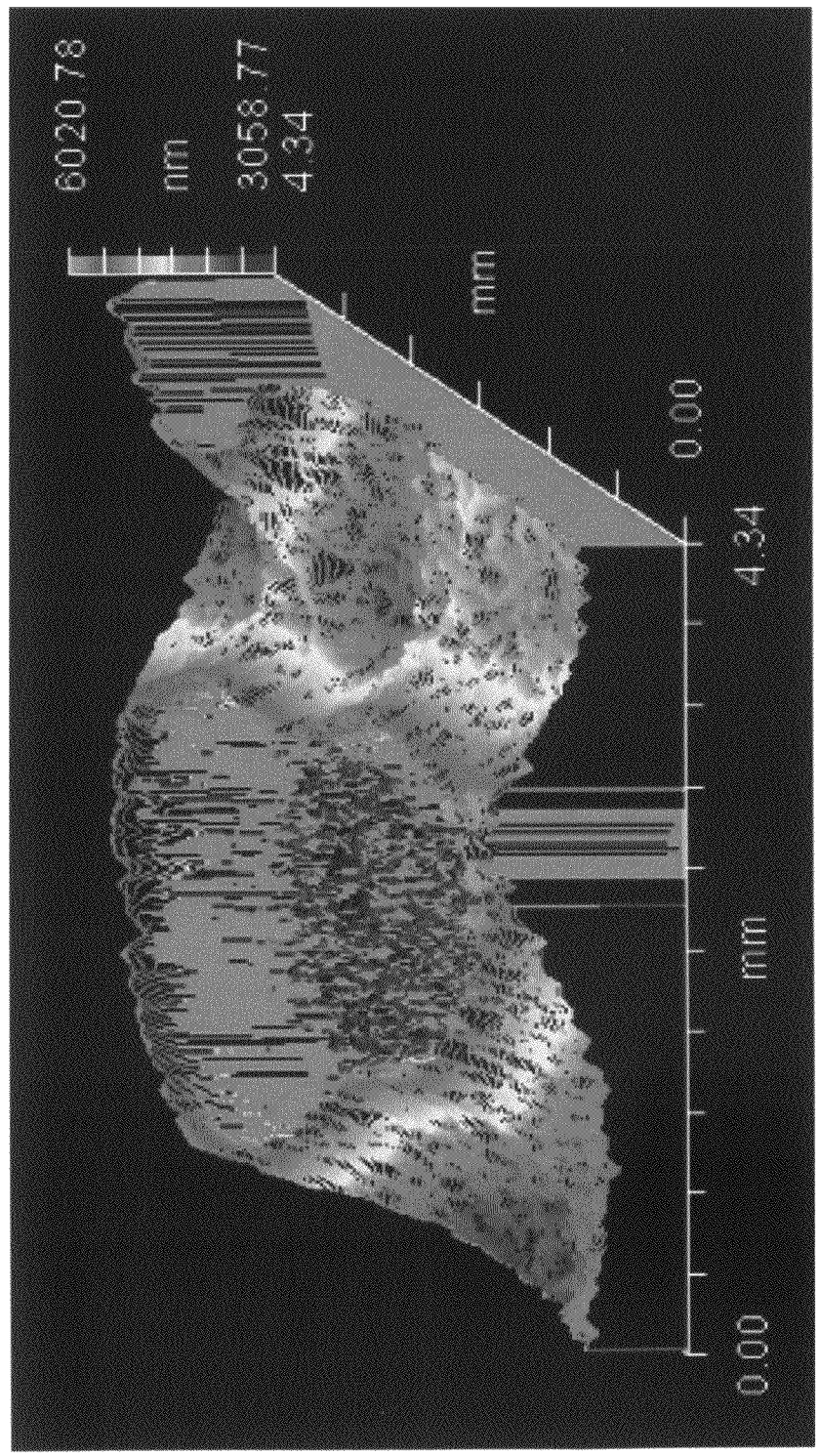
FIG. 3 shows a representation of the results of observing the surface of a solvent-treated film prepared in Example 1 (the maximum height difference is approximately 3 μm).

Using a triacetylcellulose film (80 μm thickness) by Fuji Film Co. as the optically transparent substrate material (substrate), a gravure coater was used to coat a cyclohexanone solvent, after which it was dried for 2 minutes in a blast oven at 70° C. to remove the solvent, and the obtained solvent-treated film was rolled up. When the surface form was observed using a white light interferometer (Model New View 5000 by Zygo Corp.), dome-shaped sections with depths of about 100 nm to several μm were seen over the entire surface (FIG. 3).

Antistatic Film-Forming Composition

The following components were uniformly mixed to prepare an antistatic film-forming composition.

ATO particles (product name "SN-100P" by Ishihara Techno Co., Ltd.): 100 parts by mass
Dispersing agent (product name "DISPERBYK163" by Byk-Chemie Corp.): 10 parts by mass
Butyl acetate: 990 parts by mass A gravure coater was used to coat the rolled film with an antistatic film composition (functional material) prepared as a uniform dispersion of the aforementioned composition without a binder, under predetermined conditions for lamination to a dry film thickness of about 500 nm. This was dried for 30 seconds in a blast oven at 70° C. to remove the solvent and obtain a rolled film having ATO particles placed thereon. The ATO was adhered to the substrate, and rolling could be accomplished without fouling the back side of the substrate with which the coated side was in contact. The phrase "predetermined" means that the composition was coated onto a 50 μm high-transparency PET substrate material to determine the coating conditions for gravure coating with which a film thickness of 500 nm could be obtained, and then the actual coating to the substrate will be carried out.

In addition, a hard coat layer-forming composition (resin layer) prepared by uniformly mixing and dissolving the following composition was gravure-coated onto the obtained film, and after removing the solvent by drying, an ultraviolet irradiation apparatus (light source: H bulb, Fusion UV Systems, Japan) was used for curing by ultraviolet irradiation at an exposure dose of 100 mJ/cm$^2$, to obtain an optical laminate roll with an antistatic function, having a hard coat layer formed thereon with a coated film thickness of 5 μm.

As a result of evaluating the interlayer adhesiveness of the formed optical laminate by the tape peel test, it was found that adequate adhesiveness could be ensured without peeling between at the interface. Absence of dust adhesion on the surface was also confirmed, demonstrating that antistatic performance was exhibited by addition of the ATO dispersion.

Hard Coat Layer-Forming Composition

A hard coat layer-forming composition was prepared by uniformly mixing and dissolving the following components.

Pentaerythritol triacrylate (product name "PET30" by Nippon Kayaku Co., Ltd.)
100 parts by mass
Toluene: 43 parts by mass
Leveling agent (trade name "MCF-350-5" by Dainippon Ink and Chemicals, Inc.): 2 parts by mass
Polymerization initiator (trade name "Irgacure184" by Ciba Specialty Chemicals Co., Ltd.): 4 parts by mass Example 2

A gravure coater was used to coat a triacetylcellulose film (80 μm thickness) by Fuji Film Co. as the optically transparent substrate material (substrate) with a coating solution (functional material) obtained by mixing a polythiophene-based antistatic functional layer-forming ink (trade name "TA2010" by Idemitsu Technofine Co., Ltd.) and a cyclohexanone solvent at a mass ratio of 9:1, for coating of the substrate under predetermined conditions for lamination to a dry film thickness of about 100 nm. Then, it was dried for 2 minutes in a blast oven at 70° C. to remove the solvent, in order to obtain a roll of the antistatic functional material layer placed on the substrate. The polythiophene was adhered to the substrate, and rolling could be accomplished without fouling the back side of the substrate with which the coated side was in contact.

In addition, a hard coat layer-forming composition (resin layer) prepared by uniformly mixing and dissolving the above-mentioned composition was gravure-coated onto the obtained antistatic functional material layer. After removing the solvent by drying, the ultraviolet irradiation apparatus (light source: H bulb, Fusion UV Systems, Japan) was used for curing by ultraviolet irradiation at an exposure dose of 100 mJ/cm$^2$, to obtain an optical laminate roll having a hard coat layer formed thereon with a coated film thickness of 5 μm.

As a result of evaluating the interlayer adhesiveness of the formed optical laminate by the tape peel test, it was found that adequate adhesiveness could be ensured without peeling between at the interface. Absence of dust adhesion on the surface was also confirmed, demonstrating that antistatic performance was exhibited by the polythiophene.

Example 3

A low refractive index layer-forming composition (resin layer) having the composition listed below was gravure-coated onto the functional material layer of an ATO particle-bearing film roll obtained by laminating a functional material on a substrate prepared in the same manner as Example 1, under predetermined conditions for lamination to a dry film thickness of about 100 nm. After drying to remove the solvent, the ultraviolet irradiation device (light source: H bulb, Fusion UV Systems, Japan) was used for curing by ultraviolet irradiation at an exposure dose of 100 mJ/cm$^2$, to obtain a roll with a low refractive index layer.

As a result of evaluating the interlayer adhesiveness of the formed optical laminate by the tape peel test, it was found that adequate adhesiveness could be ensured without peeling between at the interface. Absence of dust adhesion on the surface was also confirmed, demonstrating that antistatic performance and anti-reflection performance were exhibited by addition of the ATO dispersion.

Low Refractive Index Layer-Forming Composition

A low refractive index layer-forming composition was prepared by uniformly mixing and dissolving the following components.

Fluorine polymer (product name "AR110" by Daikin Industries, Ltd.): 100 parts by mass AR110 is a product comprising the fluorine polymer diluted to 15% with methyl isobutyl ketone.

Pentaerythritol triacrylate (product name "PET30" by Nippon Kayaku Co., Ltd.): 15 parts by mass Methyl isobutyl ketone: 280 parts by mass n-Butanol: 170 parts by mass Polymerization initiator (trade name "Irgacure184" by Ciba Specialty Chemicals Co., Ltd.): 1.5 parts by mass Comparative Example 1

A solvent-treated film roll was prepared in the same manner as Example 1, except that the film surface treatment solvent in Example 1 was changed from a highly permeating and dissolving cyclohexanone solvent to a low permeating and dissolving methyl isobutyl ketone solvent.

Figure 4:
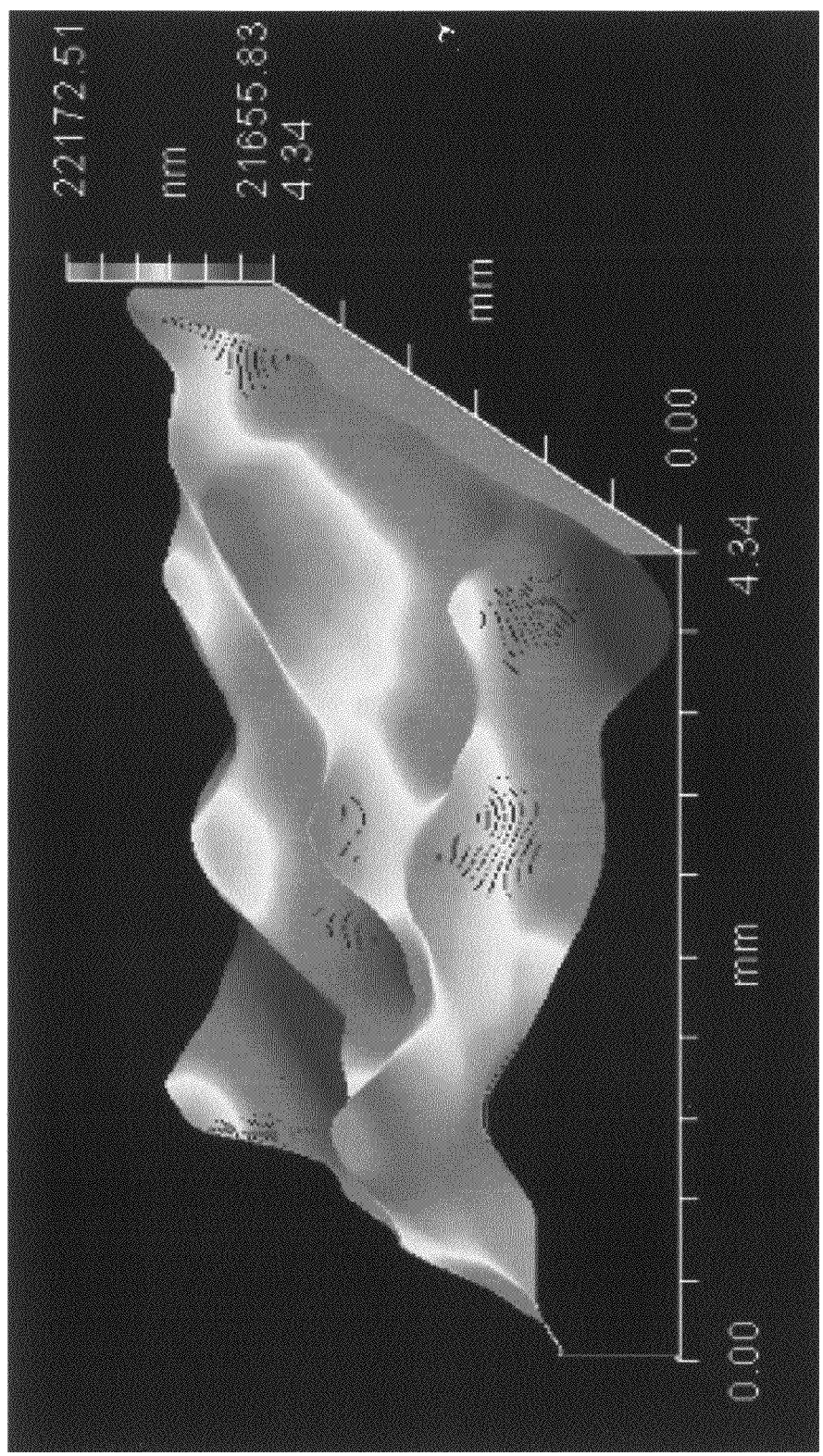
FIG. 4 shows a representation of the results of observing the surface of a solvent-treated film prepared in Comparative Example 1 (the maximum height difference is approximately 500 nm).

As a result of observing the surface form with a white light interferometer (Model New View 5000 by Zygo Corp.), none of the dome-shaped hills seen in Example 1 were found, and the surface condition was no different from that of an untreated surface (FIG. 4).

The film roll was coated with an antistatic dispersion (functional material) using a gravure coater in the same manner as Example 1, under predetermined conditions for lamination to a film thickness of about 500 nm, and then dried to remove the solvent and wound into a roll, but the ATO particles could not be placed on the substrate. Therefore, the coated side bonded to and fouled the back side of the substrate with which the coated side was in contact during rolling, making the subsequent steps impossible to be carried out.

Thus, in comparison to Examples 1, 2 and 3, it was found that when sufficient irregularities cannot be formed on the film surface serving as the substrate, it is unsuitable for production without a binder on the functional material layer.

In other words, since an ordinary substrate does not have irregularities as according to this invention, conventional functional material compositions contain binders as essential components.

Example 4

Using a triacetylcellulose film (80 μm thickness) by Fuji Film Co. as the optically transparent substrate material (substrate), a gravure coater was used to coat a cyclohexanone solvent, after which it was dried for 2 minutes in a blast oven at 70° C. to remove the solvent and obtain a solvent-treated film roll. When the surface form was observed using the white light interferometer (Model New View 5000 by Zygo Corp.), it was found that dome-shaped sections with depths of about 100 nm to several μm formed over the entire surface (FIG. 3).

Antistatic Film-Forming Composition

The following components were uniformly mixed to prepare an antistatic film-forming composition.

ATO particles (product name "SN-100P" by Ishihara Techno Co., Ltd.): 100 parts by mass Dispersing agent (product name "DISPERBYK163" by Byk-Chemie Corp.): 10 parts by mass Butyl acetate: 990 parts by mass A gravure coater was used to coat the treated film with the binderless antistatic film-forming composition (functional material) prepared earlier, under predetermined conditions for lamination to a film thickness of about 200 nm, and then the solvent was removed by drying for 30 seconds in a blast oven at 70° C. to obtain an ATO particle-placed film roll with a film thickness of approximately 200 nm. The antistatic film was adhered to the substrate, and rolling could be accomplished without fouling the back side of the substrate with which the coated side was in contact. In addition, a hard coat layer-forming composition (resin layer) prepared by uniformly mixing and dissolving the composition described below was gravure-coated onto the obtained film. After removing the solvent by drying, the ultraviolet irradiation apparatus (light source: H bulb, Fusion UV Systems, Japan) was used for curing by ultraviolet irradiation at an exposure dose of 100 mJ/cm$^2$, to form an optical laminate roll having a hard coat layer formed thereon with a coated film thickness of 1 μm.

As a result of evaluating the interlayer adhesiveness of the formed optical laminate by the tape peel test, it was found that adequate adhesiveness could be ensured without peeling between at the interface. The surface resistance value was also confirmed with a surface resistance measuring device (Hiresta IP MCP-HT260 of Mitsubishi Chemical Corp.).

Hard Coat Layer-Forming Composition

A hard coat layer-forming composition was prepared by uniformly mixing the following components.

Pentaerythritol triacrylate (product name "PET30" by Nippon Kayaku Co., Ltd.): 100 parts by mass Toluene: 43 parts by mass Leveling agent (product name "MCF-350-5" by Dainippon Ink and Chemicals, Inc.): 2 parts by mass Polymerization initiator (product name "Irgacure184" by Ciba Specialty Chemicals Co., Ltd.): 4 parts by mass Example 5

High Refractive Index Particle Film-Forming Composition

A high refractive index particle layer-forming composition was prepared by uniformly mixing the following components.

$ZrO_2$ particles (product of C.I. Kasei Co., Ltd.): 100 parts by mass

Dispersing agent (product name "DISPERBYK163" by Byk-Chemie Corp.): 10 parts by mass Toluene: 990 parts by mass A gravure coater was used to coat a film substrate material that had been surface-treated in the same manner as Example 4, with the binderless high refractive index particle film-forming composition (functional material) prepared earlier, under predetermined conditions for lamination to a film thickness of about 150 nm, and then the solvent was removed by drying for 30 seconds in a blast oven at 70° C. to obtain a $ZrO_2$-placed film roll with a film thickness of approximately 150 nm. The high refractive index particle film was adhered to the substrate, and rolling could be accomplished without fouling the back side of the substrate with which the coated side was in contact.

In addition, a hard coat layer-forming composition (resin layer) similar to the one used in Example 4 was gravure-coated onto the obtained film, and after removing the solvent by drying, the ultraviolet irradiation apparatus (light source: H bulb, Fusion UV Systems, Japan) was used for curing by ultraviolet irradiation at an exposure dose of 100 mJ/cm$^2$, to form an optical laminate roll having a hard coat layer formed thereon with a coated film thickness of 1 µm.

As a result of evaluating the interlayer adhesiveness of the formed optical laminate by the tape peel test, it was found that adequate adhesiveness could be ensured without peeling between at the interface. Prior to formation of the hard coat layer, the refractive index of the $ZrO_2$-placed film was measured using a spectroscopic ellipsometer (UVSEL by Jobin Yvon).

Comparative Example 2

An optical laminate roll was obtained in the same manner as Example 4, except that the antistatic film-forming composition in Example 4 was changed to the following composition containing a binder, and the predetermined film thickness to be laminated was approximately 300 nm. The film thickness setting was balanced with Example 4 by setting the amount of functional material in the films to be roughly equivalent.

Antistatic Film-Forming Composition

The following components were uniformly mixed to prepare an antistatic film-forming composition.

ATO particles (product name "SN-100P" by Ishihara Techno Co., Ltd.): 100 parts by mass Binder: pentaerythritol triacrylate (product name "PET30" by Nippon Kayaku Co., Ltd.): 40 parts by mass Dispersing agent (product name "DISPERBYK163" by Byk-Chemie Corp.): 10 parts by mass Polymerization initiator (product name "Irgacure184" by Ciba Specialty Chemicals Co., Ltd.): 2 parts by mass Butyl acetate: 1350 parts by mass As a result of evaluating the interlayer adhesiveness of the formed optical laminate by the tape peel test, it was found that adequate adhesiveness could be ensured without peeling at the interface. The surface resistance value was also confirmed with a surface resistance measuring device (Hiresta IP MCP-HT260 of Mitsubishi Chemical Corp.).

In comparison to Example 4, it was found that including a binder in the antistatic film-forming composition notably reduces the surface resistance value compared to the case including no binder. It was also found that the antistatic function is satisfactory in the case including no binder.

Comparative Example 3

High Refractive Index Particle Film-Forming Composition

A high refractive index particle layer-forming composition was prepared by uniformly mixing the following components.

$ZrO_2$ particles (product of C.I. Kasei Co., Ltd.): 100 parts by mass

Binder: Pentaerythritol triacrylate (product name "PET30" by Nippon Kayaku Co., Ltd.): 40 parts by mass Dispersing agent (product name "DISPERBYK163" by Byk-Chemie Corp.): 10 parts by mass Polymerization initiator (product name "Irgacure184" by Ciba Specialty Chemicals Co., Ltd.): 2 parts by mass Toluene: 1350 parts by mass An optical laminate roll was obtained in the same manner as Example 5, except that the high refractive index particle film-forming composition was changed to the above-mentioned composition containing a binder, and the predetermined film thickness to be laminated was approximately 200 nm. The film thickness setting was balanced with Example 5 by setting the amount of functional material in the films to be roughly equivalent.

As a result of evaluating the interlayer adhesiveness of the formed optical laminate by the tape peel test, it was found that adequate adhesiveness could be ensured without peeling between at the interface. Prior to formation of the low refractive index layer, the refractive index of the $ZrO_2$-placed film was measured using the spectroscopic ellipsometer (UVSEL, product of Jobin Yvon).

In comparison to Example 5, it was found that including a binder in the high refractive index particle film-forming composition notably reduces the refractive index compared to the case including no binder. It was also found that the high refractive index function is satisfactory in the case including no binder.

TABLE 1

| | Surface resistance Ω/□ | Total light transmittance (%) | Hz (%) |
|---|---|---|---|
| Example 4 | $10^7$ | 90.5 | 0.4 |
| Comp. Ex. 2 | $10^{12}$ | 90.0 | 0.4 |

| | Refractive index |
|---|---|
| Example 5 | 1.82 |
| Comp. Ex. 3 | 1.74 |

As explained above, the results of Examples 1-5 and Comparative Examples 1-3 demonstrate that formation of a functional film without a binder provides more satisfactory functionality, and that for efficient manufacture of such a film, it is effective to form irregularities in the substrate.

The TEM (electron microscope) cross-sectional photograph (40,000×, see FIG. 5) of a sample according to the manufacturing method of the invention and the TEM cross-sectional photograph (40,000×, see FIG. 6) of a sample according to a conventional manufacturing method are also shown, for further understanding of the invention.

The sample according to "the manufacturing method of the invention" was obtained by changing the solvent used for the hard coat layer-forming composition of Example 4 to methyl ethyl ketone and using a Meyer bar for manual coating of the composition for formation of each layer, drying and curing.

The sample according to the "conventional manufacturing method" was similarly obtained by manual Meyer bar coating of a methyl isobutyl ketone solvent that did not dissolve the substrate material as in Comparative Example 1, followed by Meyer bar coating of the antistatic composition of Comparative Example 2, drying and curing, and then by Meyer bar coating of the hard coat composition of Example 4, drying and curing.

The TEM cross-section was observed using a sample strip that had been embedded in resin and cut. The observation was at 10,000× magnification and further magnified to 40,000× to produce a photograph.

Both samples were set with the same amounts of ATO fine particles, as the antistatic functional material in the layer exhibiting the antistatic function.

Figure 5:
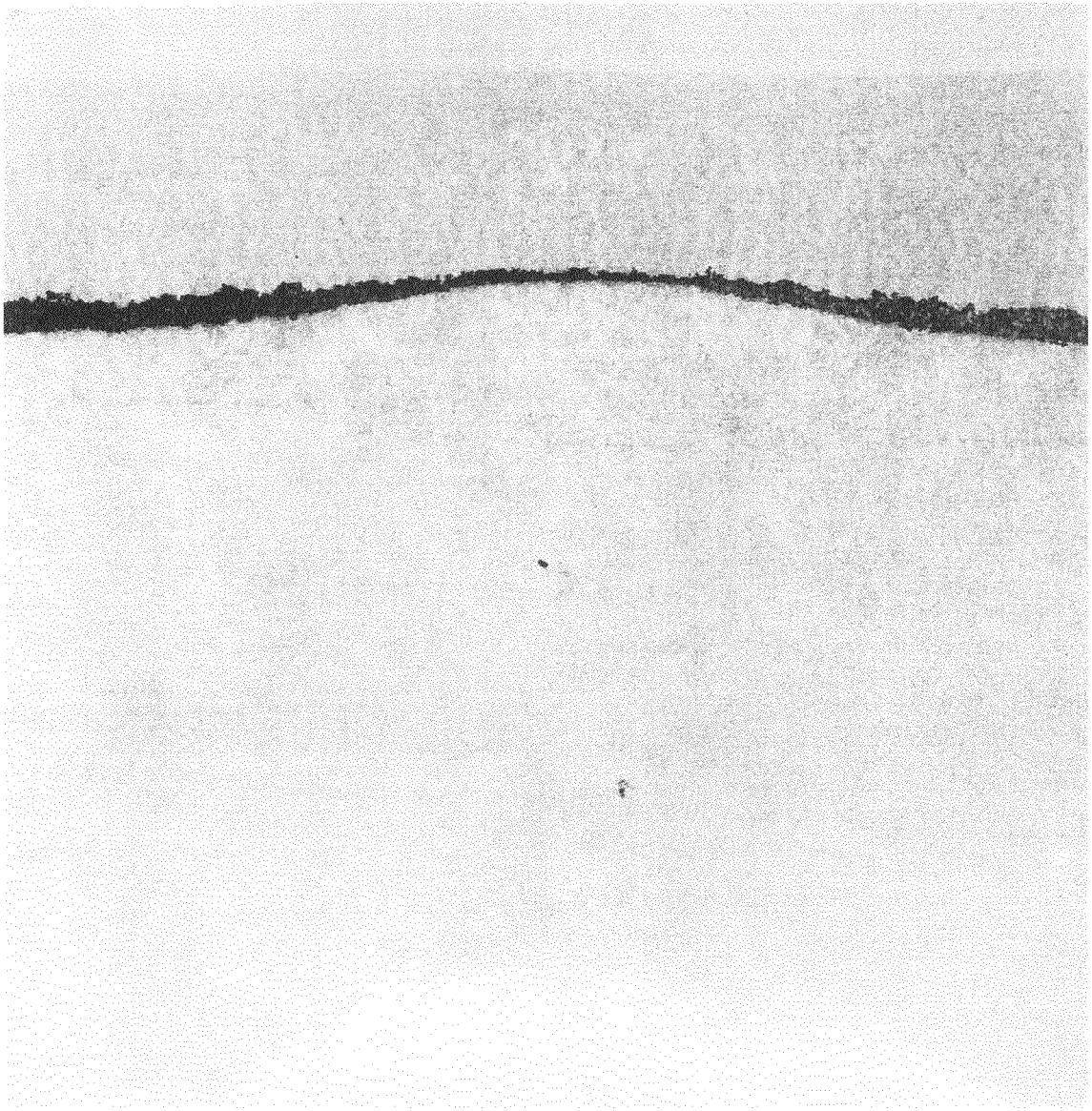
FIG. 5 shows a cross-sectional photograph of a solvent-treated film prepared by the manufacturing method of the invention.
Figure 6:
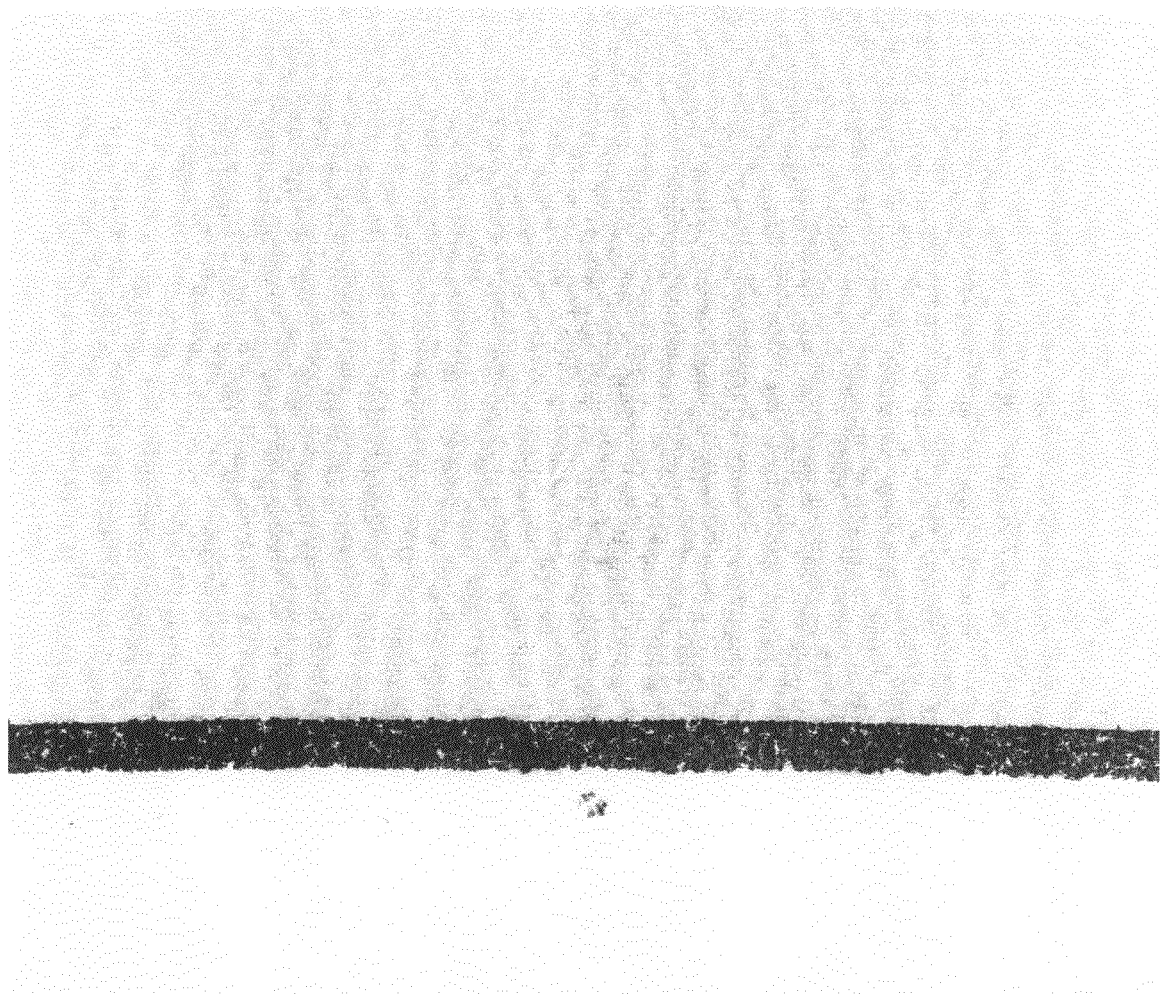
FIG. 6 shows a cross-sectional photograph of a solvent-treated film prepared by a conventional manufacturing method.

Thus, as is apparent from FIGS. 5 and 6, the antistatic layer in the cross-sectional photograph of the sample according to the manufacturing method of the invention with no binder had a small film thickness. In contrast, the cross-sectional photograph of the sample according to the conventional manufacturing method with a binder shows a large film thickness.

In addition, when a resin layer was laminated in the sample according to the manufacturing method of the invention, the hard coat layer-forming composition formed an ink with the methyl ethyl ketone solvent, but the transparent substrate material showed a permeated layer on which the hard coat layer (resin layer) was laminated. On the other hand, the sample according to the conventional manufacturing method had ink formation of the resin layer with butyl acetate but no permeated layer. The solvent of the resin layer did not affect placement of the functional material on the substrate.

In the sample according to the manufacturing method of the invention, a substrate cross-section with no permeated layer appeared, as in the substrate shown in FIG. 6, when the resin layer solvent was changed to one that did not dissolve or swell the substrate.

In the manufacturing method of the invention, it is important to form suitable irregularities in the substrate with a solvent that dissolves or swells the substrate. FIG. 5 shows the manner in which the substrate displays a gentle curve. Dense presence of a number of the functional materials can also be seen in the recesses. The overall form of the irregularities is shown in FIG. 3. While the structure includes large craters and numerous fine craters, they constitute irregularities sufficient to maintain transparency for use in an optical film for the purpose of the invention. In a binderless composition of the invention, the presence of the large craters shown in FIG. 3 is necessary to achieve satisfactory rolling up of the film, but transparency cannot be maintained if only those types of craters are present.

A cut cross-section observed by TEM revealed that the side lacked any large craters. An image plane is therefore produced which has the functional materials densely concentrated in a thin film over the raised areas of gentle irregularities.

It is assumed that essentially all of the cross-sections of irregularities formed according to the invention are of these forms, with suitably large craters and large raised areas being present. High transparency can also be maintained because of this structure.

On the other hand, FIG. 6 relating to the conventional manufacturing method indicates a clear lack of irregularities in the substrate as compared to FIG. 5. Because of the large amount of binder, the binder can be seen in FIG. 6 in a network structure in the functional material layer.

In the case of the invention as shown in FIG. 5, no such network structure is seen because of the non-use of binder, and the functional materials are densely stacked to form a structure. A film, therefore, is resulted, which has an obvious difference in density, and this dense structure exhibits the high functionality and high antistatic property according to the invention. Moreover, the irregularities of the substrate with the functional materials densely placed over its waviness can be seen when the invention was practiced.

Optical laminates obtained by the manufacturing method of the invention can, therefore, be suitably applied in cathode ray tube displays (CRT), liquid crystal displays (LCD), plasma displays (PDP), electroluminescence displays (ELD) and the like.

What is claimed is:

1. An optical laminate comprising a functional material placed on concave surfaces with random uneven craters formed on the surface of a substrate having a thickness of from 20μ to 300μ so that the materials can be in binderless contact with each other, and further comprising a resin layer formed thereon having a thickness of from 0.8 μm to 20 μm.

2. The optical laminate according to claim 1, wherein the substrate consists of either a single layer or two or more layers.

3. The optical laminate according to claim 1 wherein the substrate is a transparent substrate material.

4. The optical laminate according to claim 1, wherein the substrate is cellulose triacetate.

5. The optical laminate according to claim 1, wherein the functional material is an antistatic agent or a high refractive index agent.

6. The optical laminate according to claim 1, wherein the functional material is an organic material and the weight-average molecular weight of the organic material is 5,000-300,000.

7. The optical laminate according to claim 1, wherein the functional material is an inorganic material.

8. The optical laminate according to claim 1, wherein the resin layer is a hard coat layer or a low refractive index layer.

9. The optical laminate according to claim 1, wherein the crater has a diameter of from a few hundred nm to about 2 mm and a depth of from several nm to 3 μm.

* * * * *